United States Patent [19]
Dang

[11] Patent Number: 5,362,192
[45] Date of Patent: Nov. 8, 1994

[54] AUTOMATED DATA STORAGE LIBRARY WITH SINGLE INPUT DOUBLE GRIPPER MECHANISM

[75] Inventor: Chi H. Dang, Tucson, Ariz.

[73] Assignee: International Business Machines Corporation, Armonk, N.Y.

[21] Appl. No.: 126,275

[22] Filed: Sep. 24, 1993

[51] Int. Cl.$^5$ .............................................. B65G 1/00
[52] U.S. Cl. .................................. 414/280; 198/468.2
[58] Field of Search ............... 414/277, 280, 661, 751, 414/752, 753; 198/748, 468.2; 360/34–36; 369/92

[56] References Cited

U.S. PATENT DOCUMENTS

| | | | |
|---|---|---|---|
| 3,865,228 | 2/1975 | Hufford | 198/748 |
| 4,361,411 | 11/1982 | Di Liddo | 414/277 |
| 4,690,602 | 9/1987 | Castaldi et al. | 414/751 X |
| 4,690,611 | 9/1987 | Nobuhara | 414/661 |
| 4,787,310 | 11/1988 | Tiemann | 198/468.2 X |
| 4,815,055 | 3/1989 | Fago, Jr. | 369/36 |
| 4,846,619 | 7/1989 | Crabtree et al. | 414/280 X |
| 5,213,463 | 5/1993 | Rothlisberger et al. | 414/280 |

FOREIGN PATENT DOCUMENTS

| | | | |
|---|---|---|---|
| 3710650 | 10/1988 | Germany | 414/751 |
| 36003 | 2/1984 | Japan | 414/280 |
| 313215 | 12/1989 | Japan | 414/751 |
| 292150 | 12/1990 | Japan | 414/751 |
| 1014788 | 4/1983 | U.S.S.R. | 414/280 |

*Primary Examiner*—David A. Bucci
*Attorney, Agent, or Firm*—Baker, Maxham, Jester & Meador

[57] ABSTRACT

An automated data storage library includes a plurality of storage cells for holding storage media cartridges therein. A picker mechanism is positioned for accessing and transporting the storage media cartridges between the storage cells. At least two cartridge grippers are mounted on the picker mechanism for selective movement along respective gripper paths. The grippers are configured for releasably gripping and supporting the storage media cartridges during transport between the storage cells. A gripper drive system mounted on the picker mechanism is used for positioning the grippers along the respective gripper paths. The gripper drive system includes a gripper engagement element for selectively engaging each of the grippers. A power system mounted on the picker mechanism is operatively connected to power the gripper drive system during gripper positioning.

31 Claims, 2 Drawing Sheets

5,362,192

AUTOMATED DATA STORAGE LIBRARY WITH SINGLE INPUT DOUBLE GRIPPER MECHANISM

BACKGROUND OF THE INVENTION

The present invention relates to automated data storage libraries for storing and retrieving cartridges with data storage media therein, for use by data processing apparatus having access to such libraries.

Automated data storage libraries provide a data storage environment in which large quantities of data are distributed between a plurality of discrete data storage elements, such as magnetic tape or optical disk cartridges, which are placed in addressable storage cell locations arranged in one or more storage cell banks. The storage elements are accessed using positionable cartridge picker mechanisms which may include one or more selectively activatable cartridge grippers.

In order to transport a data storage element between storage cell locations, one of which may contain a data read/write unit in communication with a host data processing system, a picker mechanism is first positioned at a source storage cell containing a data storage element to be retrieved. A gripper is activated to engage the storage element and retract it from the storage cell. The picker mechanism is then positioned at a destination cell and the gripper is again activated to insert the storage element in the storage cell and release it. In some data storage libraries, it is desirable to employ two or more grippers in a single picker mechanism. Using multiple grippers minimizes picker travel because plural data storage elements can be transported simultaneously. Moreover, a picker mechanism that accesses two opposing storage cell banks on either side of the picker mechanism preferably utilizes a gripper for each bank.

A disadvantage of prior art, multiple gripper picker mechanisms is that discrete gripper drive systems are used to control gripper positioning. This requires a duplication of hardware components and associated control system support functionality. The result is increased complexity and cost, as well as reduced response time due to increased picker mass caused by hardware and control system redundancy.

Accordingly, an evident need exists for an automated data storage library having multiple gripper picker capability but without the attendant disadvantages of multiple gripper drive systems. What is required is a system of reduced complexity and cost in which data storage and retrieval times are effectively minimized.

SUMMARY OF THE INVENTION

In accordance with the foregoing objectives, an automated data storage library of unique design is provided. The data storage library includes a plurality of storage cells for holding storage media cartridges therein. A picker mechanism is positioned for accessing and transporting the storage media cartridges between the storage cells. At least two cartridge grippers are mounted on the picker mechanism for selective movement along respective gripper paths. The grippers are configured for releasably gripping and supporting the storage media cartridges during transport between the storage cells. A gripper drive system mounted on the picker mechanism is used for positioning the grippers along the respective gripper paths. The gripper drive system includes a gripper engagement element for selectively engaging each of the grippers. A power system mounted on the picker mechanism is operatively connected to power the gripper drive system during gripper positioning.

BRIEF DESCRIPTION OF THE DRAWINGS

The objects, features and advantages of the invention will be more easily understood when considered in light of the following detailed description, together with the accompanying drawing figures, in which.

DETAILED DESCRIPTION OF THE PREFERRED EMBODIMENTS

Figure 1:
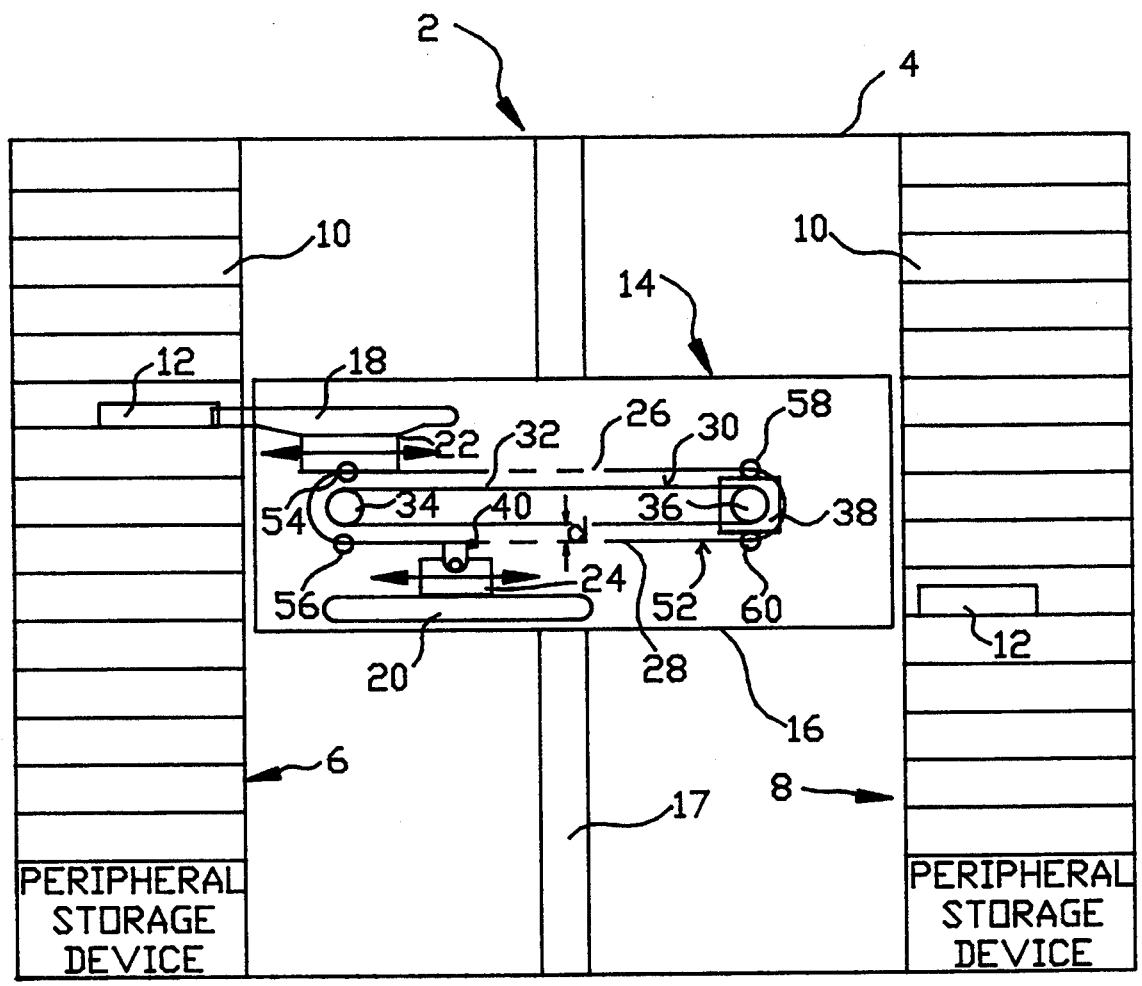
FIG. 1 is a side elevation view of an automated data storage library constructed in accordance with a first aspect of the present invention.

Referring now to FIG. 1, a data storage library 2 includes a cabinet or housing 4 having disposed therein plural storage cell banks 6 and 8. Each storage cell bank is formed from a plurality of storage cells 10 for retaining storage media cartridges 12 therein. The data storage library 2 could also include one or more peripheral storage devices in communication with one or more host data processing systems. The peripheral storage devices are conveniently positioned for receiving storage media cartridges from any of the storage cell locations. The storage media cartridges could be of any conventional type including magnetic tape cassettes and optical disk cartridges. Positioned between the storage cell banks 6 and 8 is a single drive input double gripper picker mechanism 14. The picker mechanism 14 can be designed and configured in many ways but in all cases will possess the capability of driving at least two cartridge grippers using a selectively engageable single drive element.

In the data storage library of FIG. 1, the picker mechanism 14 includes a positionable picker device 16 mounted on a transport system 17 that includes a transport drive (not shown) of conventional design for selectively positioning the picker device adjacent any of the storage cells 10. Mounted within the picker mechanism 14 are a pair of cartridge grippers 18 and 20. The cartridge grippers include respective gripper drive blocks 22 and 24 which are used for positioning the grippers in a manner to be described in more detail below. The grippers are configured to releasably grip and support storage media cartridges during transport between the storage cells. The cartridge gripping and support functions are preferably implemented in conventional fashion.

The cartridge grippers 18 and 20 are selectively positionable along respective gripper paths 26 and 28 via a gripper drive system 30 that is mounted within the picker mechanism 14 between the gripper paths. The gripper drive system 30 can be formed in a variety of configurations but in the data storage library of FIG. 1 includes a continuous drive member (e.g. belt) 32 mounted on a pair of support pulleys 34 and 36. A power system including a gripper drive motor 38 is also mounted within the picker device 14 for applying power to the pulley 36 and activating the drive member 32 to rotate around the pulleys.

Figure 2:
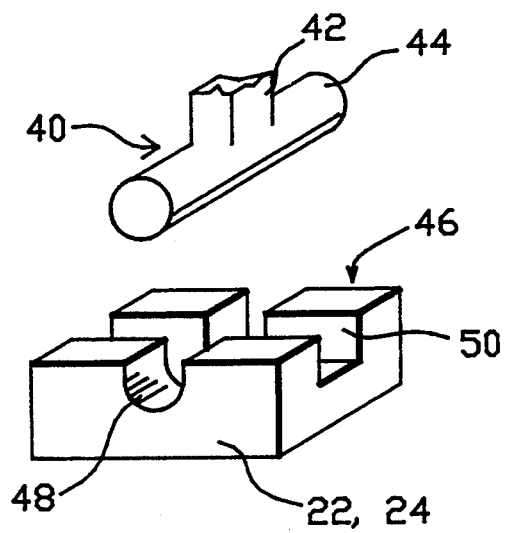
FIG. 2 is a detailed perspective view of a cartridge gripper drive element which may be used in the data storage library of FIG. 1.

The cartridge grippers 18 and 20 can be positioned between an access position for retrieving a storage media cartridge and a retracted position wherein a storage media cartridge is fully removed from the storage cell banks. This positioning is effected using a cartridge gripper engagement element 40 which is mounted to the continuous drive member 32 for rotation therewith. As shown in more detail in FIG. 2, the engagement element 40 includes a shank 42 attached at one end to the drive member 32 and at the other end to an engagement pin 44. The cartridge grippers 18 and 20 are configured to receive the engagement pin 34 via a slot arrangement 46 formed in each of the gripper drive blocks 22 and 24. The slot arrangement 46 includes a transverse primary slot 48 for receiving the pin 44 and a longitudinal secondary slot 50 for receiving the shank 42.

As can be seen in FIG. 1, the engagement pin 44 describes an engagement path 52 that extends a distance "d" from the continuous drive member 32. The engagement path 52 intersects the cartridge gripper paths 26 and 28 at engagement locations 54 and 56 adjacent the pulley 34, and engagement locations 58 and 60 adjacent the pulley 36. These engagement locations are the points at which selective engagement between the engagement pin 44 and the cartridge grippers 18 and 20 is implemented. Advantageously, the cartridge grippers 18 and 20 will also be positioned at the engagement locations 54, 56, 58, 60 upon disengagement from the engagement pin 44. In this way, the engagement of the cartridge grippers by the gripper drive system 30 is rendered mutually exclusive. Only one cartridge gripper can be engaged and positioned by the drive system at a time, and the precise position of the cartridge gripper can be determined at all times.

Figure 3:
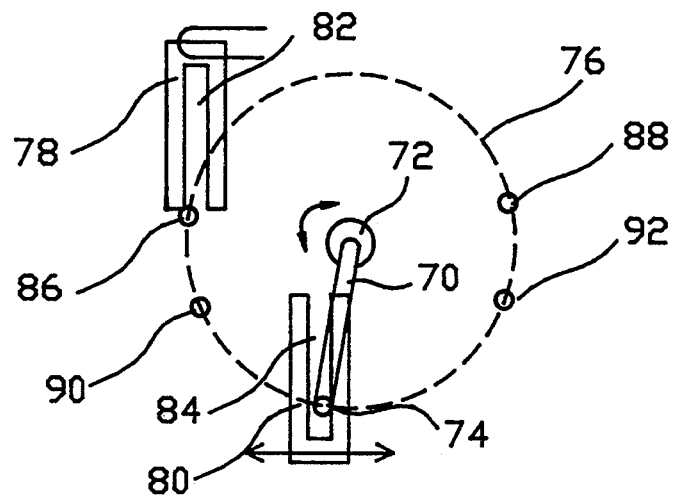
FIG. 3 is a partial side elevation view of an automated data storage library constructed in accordance with a second aspect of the present invention.

Referring now to FIG. 3, a second embodiment of the invention having a modified cartridge gripper drive system is shown wherein the continuous drive member 32 is replaced with a rotating drive arm 70. The drive arm 70 is mounted at a first end thereof to a central drive hub 72 that is connected to a power source (not shown) for rotatably driving the arm 70 around the hub 72. At the opposite second end of the drive arm 70 is an engagement pin 74 extending perpendicularly with respect to the longitudinal axis of the arm 70, i.e., out of the plane of FIG. 3. The engagement pin 74 describes a circular arc illustrated in phantom line representation by reference number 76.

Positioned to intersect the circular arc 76 and selectively engage the engagement pin 74, are a pair of gripper drive blocks 78 and 80. These gripper drive blocks are mounted to corresponding cartridge grippers (not shown) for positioning the grippers during cartridge transport operations. The gripper drive blocks 78 and 80 include respective receptacle channels 82 and 84 that are configured and adapted to receive the engagement pin 74 when the pin is positioned at selected locations. Those pin engagement locations are shown in FIG. 3 by reference numbers 86, 88, 90 and 92. The pin engagement locations 86 and 88 represent the endpoints of the horizontal positioning path of the gripper drive block 78. The pin engagement locations 90 and 92 represent the endpoints of the horizontal positioning path of the gripper drive block 80. It can be seen that rotation of the drive arm 70 will cause a horizontal positioning of the gripper drive blocks 78 and 80 when the drive blocks are engaged by the engagement pin 74. Thus, the channels 82 and 84 are both deep enough to accommodate the vertical component of the rotational motion of the engagement pin as it moves between the engagement point pairs 86/88 and 90/92. These engagement locations are the points at which selective engagement between the engagement pin 74 and the gripper blocks 78 and 80 is implemented. Advantageously, the gripper blocks will also be positioned at the engagement locations 86, 88, 90, 92 upon disengagement from the engagement pin 74. In this way, the engagement of the cartridge grippers by the gripper drive system of FIG. 3 is rendered mutually exclusive. Only one cartridge gripper can be engaged and positioned by the drive system at a time, and the precise position of the cartridge grippers can be determined at all times.

Figure 4:
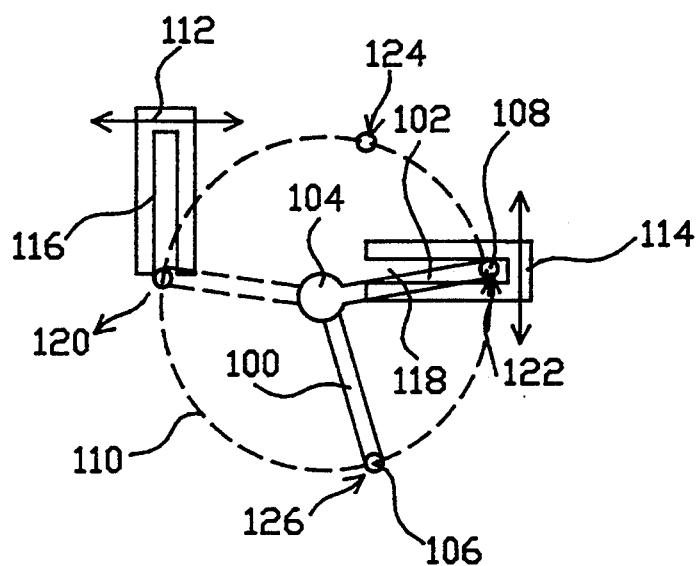
FIG. 4 is a partial side elevation view of an automated data storage library constructed in accordance with a third aspect of the present invention.

Referring now to FIG. 4, a third embodiment of the invention is shown wherein a pair of grippers are driven in mutually perpendicular directions. A pair of rotating drive arms 100 and 102 are mounted at respective first ends thereof to a common central drive hub 104. The drive hub 104 is connected to a power source (not shown) for rotatably driving the arms 100 and 102 around the hub 104. At the opposite second ends of the drive arms 100 and 102 are respective engagement pins 106 and 108 extending perpendicularly with respect to the longitudinal axes of the arms 100 and 102, i.e., out of the plane of FIG. 4. The engagement pins 106 and 108 describe a common circular arc illustrated in phantom line representation by reference number 110.

Positioned to intersect the circular arc 110 and selectively engage the engagement pins 106 and 108, are a pair of gripper drive blocks 112 and 114. These gripper drive blocks are mounted to corresponding cartridge grippers (not shown) for positioning the grippers during cartridge transport operations along mutually perpendicular paths. The gripper drive blocks 112 and 114 include respective receptacle channels 116 and 118 that are respectively configured and adapted to receive the engagement pins 106 and 108 when the pins are positioned at selected locations. Those pin engagement locations are shown in FIG. 4 by reference numbers 120, 122, 124 and 126. The pin engagement locations 120 and 122 correspond to the drive arm 100 and the engagement pin 106, and represent the endpoints of the horizontal positioning path of the gripper drive block 112. The pin engagement locations 124 and 126 correspond to the drive arm 102 and the engagement pin 108, and represent the endpoints of the vertical positioning path of the gripper drive block 114.

It can be seen that rotation of the drive arm 100 will cause a horizontal positioning of the gripper drive block 112 when the drive block is engaged by the engagement pin 106. Thus, the channel 116 is deep enough to accommodate the vertical component of the rotational motion of the engagement pin 106 as it moves between the engagement point pairs 120 and 122. These engagement locations are the points at which selective engagement between the engagement pin 106 and the gripper block 112 is implemented. It can be seen that rotation of the drive arm 102 will cause a vertical positioning of the gripper drive block 114 when the drive block is engaged by the engagement pin 108. Thus, the channel 118 is deep enough to accommodate the horizontal component of the rotational motion of the engagement pin 108 as it moves between the engagement point pairs 124 and 126. These engagement locations are the points at which selective engagement between the engagement pin 108 and the gripper block 114 is implemented.

In order to transition between driving the gripper blocks 112 and 114, the drive arms 100 and 102 will be positioned in the lower left quadrant of FIG. 4 with the gripper block 112 at engagement location 120, and the gripper block 114 at engagement location 126. Advantageously, the gripper blocks will be positioned at these engagement locations upon disengagement from their respective engagement pins 106 and 108. In this way, the engagement of the cartridge grippers by the gripper drive system of FIG. 4 is rendered mutually exclusive. Only one cartridge gripper can be engaged and positioned by the drive system at a time, and the precise position of the cartridge gripper can be determined at all times.

Accordingly, an automated data storage library with a single input double gripper picker mechanism has been described. While various embodiments have been disclosed, it should be apparent that many variations and alternative embodiments would be apparent to those skilled in the art in view of the teachings herein. For example, although systems with parallel and mutually perpendicular gripper paths have been disclosed, it would be possible to implement a system wherein the grippers are positionable along paths oriented at other angles, for example, by modifying the system of FIG. 4. Moreover, although the engagement of the gripper blocks is preferably mutually exclusive, simultaneous gripper block engagement could be implemented, for example, by modifying the system of FIG. 4 so that the engagement pin 106 engages the gripper block 114 and the engagement pin 108 engages the gripper block 112. It is understood, therefore, that the invention is not to be in any way limited except in accordance with the spirit of the appended claims and their equivalents.

We claim:

1. An automated data storage library, comprising:
   a plurality of storage cells for holding storage media cartridges therein;
   a picker mechanism positioned for accessing said storage cells and transporting said storage media cartridges therebetween;
   at least two cartridge grippers mounted on said picker mechanism for selective movement along respective gripper paths, said grippers being configured for releasably gripping and supporting said storage media cartridges during transport between said storage cells;
   a gripper drive system mounted on said picker mechanism for positioning said grippers along said respective gripper paths;
   a gripper engagement element mounted on said gripper drive system for selectively engaging said grippers; and
   a power system mounted on said picker mechanism and operatively connected to power said gripper drive system.

2. The data storage library of claim 1 wherein said gripper drive system includes a continuous drive member and a pair of support pulleys to which said drive member is mounted.

3. The data storage library of claim 1 wherein said gripper drive system includes a drive arm and a central drive axis to which said drive arm is mounted.

4. The data storage library of claim 1 wherein said gripper drive system includes a pair of drive arms and a central drive axis to which said drive arms are mounted.

5. The data storage library of claim 1 wherein said gripper engagement element includes a drive pin and said cartridge grippers each include a slot for receiving said pin.

6. The data storage library of claim 1 wherein said respective gripper paths are mutually parallel.

7. The data storage library of claim 1 wherein said respective gripper paths are mutually perpendicular.

8. The data storage library of claim 1 wherein said gripper drive system includes a continuous drive member mounted on a pair of support pulleys, wherein said gripper paths are mutually parallel and respectively positioned above and below said continuous drive member, and wherein said gripper engagement element includes a drive pin mounted on said continuous drive member and said cartridge grippers each include a slot for receiving said pin as said drive member is driven.

9. The data storage library of claim 1 wherein said gripper drive system includes a drive arm mounted for rotation about a central drive axis, wherein said gripper paths are mutually parallel and respectively positioned above and below said drive arm, and wherein said gripper engagement element includes a drive pin mounted on said drive arm and said cartridge grippers each include a slot for receiving said pin as said drive arm rotates.

10. The data storage library of claim 1 wherein said gripper drive system includes a pair of drive arms mounted for rotation about a central drive axis, wherein said gripper paths are mutually perpendicular, and wherein said gripper engagement element includes a drive pin mounted on each of said drive arms and said cartridge grippers each include a slot for receiving said pins as said drive arms rotate.

11. The data storage library of claim 1 wherein said cartridge grippers have a drive system engagement position for receiving said gripper engagement element.

12. An automated data storage library, comprising:
    a storage library housing;
    a plurality of storage cells arranged within said housing for holding storage media cartridges therein;
    a single drive input double gripper picker device positionable for accessing said storage cell bank and transporting said storage media cartridges between said storage cells; and
    means for positioning said picker device between selected ones of said storage cells for transporting selected ones of said storage media cartridges therebetween.

13. The data storage library of claim 12 wherein said picker device includes a pair of cartridge grippers driven along mutually parallel paths.

14. The data storage library of claim 12 wherein said picker device includes a pair of cartridge grippers driven along mutually perpendicular paths.

15. The data storage library of claim 12 wherein said picker includes a pair of cartridge grippers positionable along respective drive paths and a single drive input that is selectively engageable to drive said cartridge grippers along said drive paths.

16. The data storage library of claim 15 wherein said cartridge grippers each have an engagement position for engaging said single drive input.

17. The data storage library of claim 16 wherein said engagement positions are selected so that said single drive input engages one, but not both, of said cartridge grippers at a time.

18. The data storage library of claim 15 wherein said single drive input includes an engagement member mounted to be driven along an engagement path that intersects each of said cartridge gripper drive paths at respective engagement locations.

19. The data storage library of claim 18 wherein said engagement locations for each of said cartridge grippers are mutually exclusive.

20. An automated data storage library, comprising:
a storage library housing;
a plurality of storage cells arranged as a bank of storage cells within said housing for holding storage media cartridges therein;
a single drive input double gripper picker mechanism positioned for accessing said storage cell bank and transporting said storage media cartridges between said storage cells, said picker mechanism including:
at least one drive engagement member mounted on said picker mechanism for transport along a common engagement path;
at least two cartridge grippers mounted on said picker mechanism for transport along respective gripper drive paths, said cartridge grippers each being adapted to engage said at least one drive engagement member;
said common engagement path intersecting a portion of each of said gripper drive paths; and
single drive means mounted on said picker mechanism for driving said at least one drive engagement member along said common engagement path.

21. An automated data storage library, comprising:
a plurality of storage cells for holding storage media cartridges therein;
a peripheral storage device in communication with a host data processing system receiving storage media cartridges from said storage cells;
a picker mechanism positioned tier accessing said storage cells and said peripheral storage device and transporting said storage media cartridges therebetween;
at least two cartridge grippers mounted on said picker mechanism for selective movement along respective gripper paths, said grippers being configured for releasably gripping and supporting said storage media cartridges during transport between said storage cells and said peripheral storage device;
a gripper drive system mounted on said picker mechanism for positioning said grippers along said respective gripper paths;
a gripper engagement element mounted on said gripper drive system for selectively engaging said grippers; and a power system mounted on said picker mechanism and operatively connected to power said gripper drive system.

22. The data storage library of claim 21 wherein said gripper drive system includes a continuous drive member and a pair of support pulleys to which said drive member is mounted.

23. The data storage library of claim 21 wherein said gripper drive system includes a drive arm and a central drive axis to which said drive arm is mounted.

24. The data storage library of claim 21 wherein said gripper drive system includes a pair of drive arms and a central drive axis to which said drive arms are mounted.

25. The data storage library of claim 21 wherein said gripper engagement element includes a drive pin and said cartridge grippers each include a slot for receiving said pin.

26. The data storage library of claim 21 wherein said respective gripper paths are mutually parallel.

27. The data storage library of claim 21 wherein said respective gripper paths are mutually perpendicular.

28. The data storage library of claim 21 wherein said gripper drive system includes a continuous drive member mounted on a pair of support pulleys, wherein said gripper paths are mutually parallel and respectively positioned above and below said continuous drive member, and wherein said gripper engagement element includes a drive pin mounted on said continuous drive member and said cartridge grippers each include a slot for receiving said pin as said drive member is driven.

29. The data storage library of claim 21 wherein said gripper drive system includes a drive arm mounted for rotation about a central drive axis, wherein said gripper paths are mutually parallel and respectively positioned above and below said drive arm, and wherein said gripper engagement element includes a drive pin mounted on said drive arm and said cartridge grippers each include a slot for receiving said pin as said drive arm rotates.

30. The data storage library of claim 21 wherein said gripper drive system includes a pair of drive arms mounted for rotation about a central drive axis, wherein said gripper paths are mutually perpendicular, and wherein said gripper engagement element includes a drive pin mounted on each of said drive arms and said cartridge grippers each include a slot for receiving said pins as said drive arms rotate.

31. The data storage library of claim 21 wherein said cartridge grippers have a drive system engagement position for receiving said gripper engagement element.

* * * * *

UNITED STATES PATENT AND TRADEMARK OFFICE
CERTIFICATE OF CORRECTION

PATENT NO. : 5,362,192

DATED : November 8, 1994

INVENTOR(S) : Dang

It is certified that error appears in the above-indentified patent and that said Letters Patent is hereby corrected as shown below:

Column 7, line 33, please insert --for-- between "system" and "receiving"; and line 35, please change "tier" to --for--.

Signed and Sealed this

Twenty-fourth Day of January, 1995

Attest:

BRUCE LEHMAN

Attesting Officer

Commissioner of Patents and Trademarks